(12) United States Patent
Berger et al.

(10) Patent No.: US 9,722,309 B2
(45) Date of Patent: Aug. 1, 2017

(54) MOBILE RADIO ANTENNA COMPRISING A MULTI BEAM FORMING DEVICE

(75) Inventors: Stefan Berger, Thansau-Rohrdorf (DE); Ralf Häntsch, Raubling (DE)

(73) Assignee: Kathrein-Werke KG, Rosenheim (DE)

( * ) Notice: Subject to any disclaimer, the term of this patent is extended or adjusted under 35 U.S.C. 154(b) by 1043 days.

(21) Appl. No.: 13/981,398

(22) PCT Filed: Dec. 1, 2011

(86) PCT No.: PCT/EP2011/006033
§ 371 (c)(1),
(2), (4) Date: Jul. 24, 2013

(87) PCT Pub. No.: WO2012/100796
PCT Pub. Date: Aug. 2, 2012

(65) Prior Publication Data
US 2013/0307728 A1 Nov. 21, 2013

(30) Foreign Application Priority Data

Jan. 27, 2011 (DE) .......................... 10 2011 009 600

(51) Int. Cl.
*H01Q 3/32* (2006.01)
*H01Q 1/24* (2006.01)
(Continued)

(52) U.S. Cl.
CPC .............. *H01Q 3/32* (2013.01); *H01Q 1/246* (2013.01); *H01Q 3/005* (2013.01); *F16H 37/065* (2013.01)

(58) Field of Classification Search
CPC .......... H01Q 3/32; H01Q 3/005; H01Q 1/245; F16H 37/065; F16H 1/22; F16H 1/227;
(Continued)

(56) References Cited

U.S. PATENT DOCUMENTS 3,686,974 A * 8/1972 Little, Jr. .................. F16H 1/22
192/41 S
3,872,578 A * 3/1975 Ullom .................... B23P 11/00
29/525
(Continued)

FOREIGN PATENT DOCUMENTS

CN 1541430 A 10/2004
CN 2672379 Y 1/2005
(Continued)

OTHER PUBLICATIONS

International Search Report for PCT/EP2011/006033, mailed Mar. 23, 2012.
(Continued)

*Primary Examiner* — Bernarr Gregory
*Assistant Examiner* — Fred H Mull
(74) *Attorney, Agent, or Firm* — Nixon & Vanderhye P.C.

(57) ABSTRACT

A mobile radio antenna comprises a multi beam forming device which comprises a drivable drive element having a drive shaft and at least two output shafts. Each output shaft is substantially parallel to the drive shaft. At least one output gear is rotationally fixed to the output shaft. At least two phase shifters are each operatively connected to a respective output shaft via a respective drive device. A changeover device enables the drive element to be operatively connected selectively to at least one of the output gears.

23 Claims, 14 Drawing Sheets

(51) Int. Cl.
*H01Q 3/00* (2006.01)
*F16H 37/06* (2006.01)

(58) Field of Classification Search
CPC ......... F16H 37/0813; F16H 2003/0931; F16H 2003/0938; F16H 3/093; Y01T 74/19367
USPC .................................. 74/664, 354, 325, 331
See application file for complete search history.

(56) References Cited

U.S. PATENT DOCUMENTS

| | | | | |
|---|---|---|---|---|
| 4,334,439 A | * | 6/1982 | Kadymir | B23B 39/166 173/50 |
| 4,942,781 A | * | 7/1990 | Hori | F16H 1/46 475/342 |
| 2003/0177862 A1 | * | 9/2003 | Chan | B23Q 5/34 74/661 |
| 2010/0062892 A1 | * | 3/2010 | Vogel | F16H 48/08 475/230 |
| 2010/0201590 A1 | * | 8/2010 | Girard | H01Q 1/246 343/766 |
| 2010/0201591 A1 | * | 8/2010 | Girard | H01Q 1/246 343/766 |

FOREIGN PATENT DOCUMENTS

| | | |
|---|---|---|
| WO | WO 02/061877 | 8/2002 |
| WO | 2009/102775 A3 | 8/2009 |
| WO | WO 2009/102774 | 8/2009 |
| WO | WO 2009/102775 | 8/2009 |

OTHER PUBLICATIONS

Written Opinion for PCT/EP2011/006033, mailed Mar. 23, 2012.
International Preliminary Report on Patentability for PCT/EP2011/006033, mailed Feb. 19, 2013.
English translation of the International Preliminary Report on Patentability issued in corresponding International Application No. PCT/EP2011/006033 mailed Aug. 1, 2013.

* cited by examiner

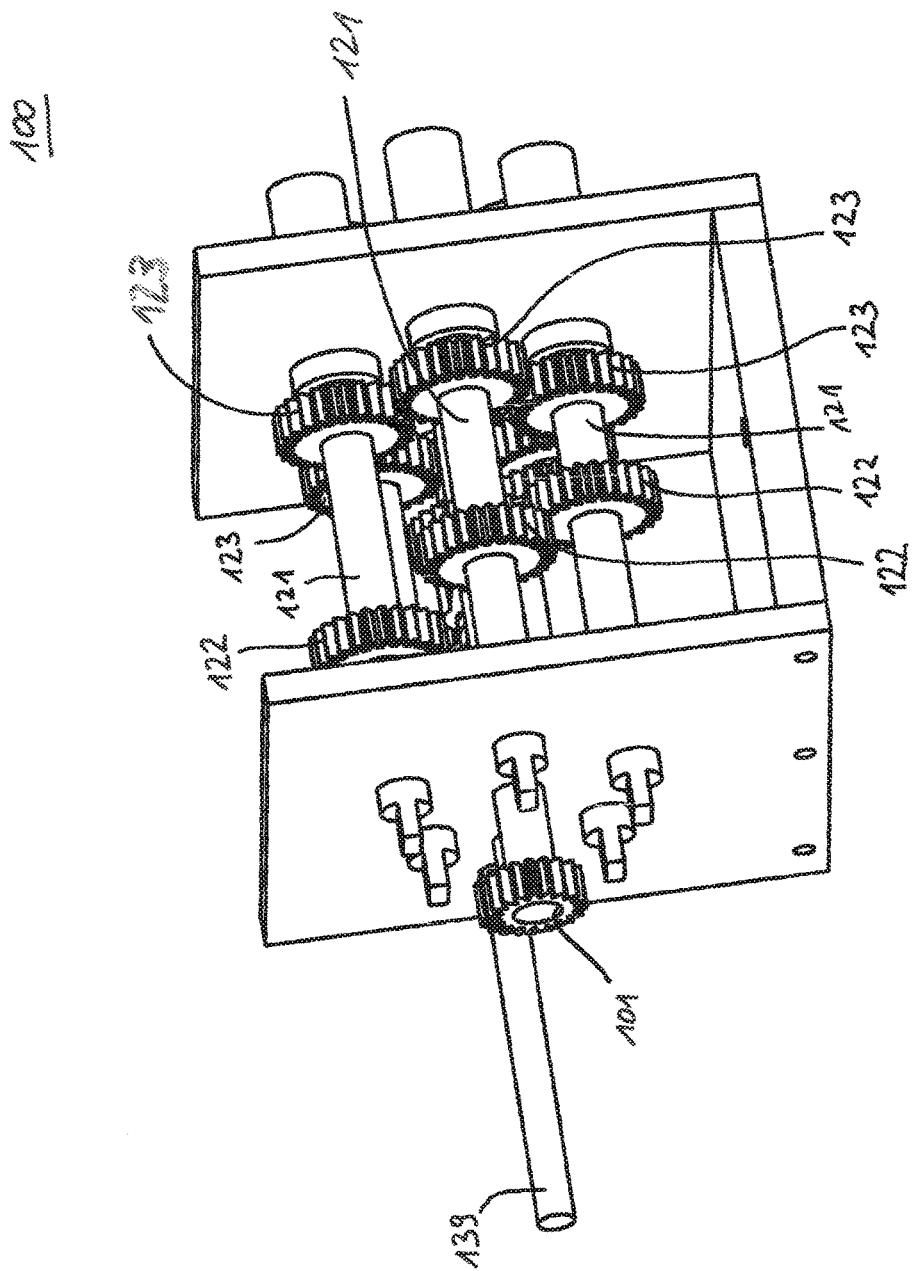

MOBILE RADIO ANTENNA COMPRISING A MULTI BEAM FORMING DEVICE

This application is the U.S. national phase of International Application No. PCT/EP2011/006033 filed 1 Dec. 2011 which designated the U.S. and claims priority to DE Patent Application No. 10 2011 009 600.0, filed 27 Jan. 2011. The entire contents of each of these are hereby incorporated by reference.

The invention relates to a mobile communications antenna comprising a multi-beam-shaping means by means of which at least two phase shifters arranged in the mobile communications antenna can be actuated.

Beam-shaping means are used in particular in mobile communications technology, that is to say in mobile communications base stations, so as to set the primary source of a mobile communications antenna differently in terms of the angle of radiation thereof. As a function of the down-tilt angle, a relevant mobile communications cell can be illuminated to a different extent and thus be set.

Beam-shaping means of this type are conventionally referred to as RET units, that is to say they are referred to as "remote electrical tilt" means, such as are known for example from WO 02/061877 A2. However, by means of a beam-shaping means, not only can a different down-tilt angle be set in the elevation direction for example by way of different settings of phase shifters, but the primary beam direction and thus the primary source of an antenna installation can also be adjusted in the horizontal direction, that is to say with a different azimuth angle, in particular in an antenna array comprising a plurality of gaps, for example by using phase shifters. Finally, by means of a beam-shaping means, not only can a different orientation of the primary beam direction of an antenna installation be set in the elevation direction and/or in the azimuth direction, but the beam width can also be set both in the azimuth and in the elevation direction, so as thus to be able to set the half-power beam width of a primary beam lobe differently in this context. It is also possible to carry out adjustments to the mechanical angle of an antenna, namely roll, pitch and yaw.

In other words, the previously known antennae are generally configured in such a way that what is known as the RET unit, which as well as electronics also comprises a motor which controls the phase shifters integrated into the antenna via a mechanical implementation, can be installed on a mechanical interface provided for this purpose (for example on the lower mounting flange of the antenna housing). The phase shift which is thus achieved has a direct effect on the beam characteristic, that is to say on the down-tilt angle of the antenna.

By means of RET units of this type, the beam characteristics of multi-antenna installations can in principle be set differently, it being possible to use the aforementioned RET motors for setting the primary beam direction of the antenna not only in the vertical direction (that is to say in the elevation direction for setting a different down-tilt angle), but also in the horizontal direction (that is to say in the azimuth direction), as well as for setting the half-power beam width of a primary lobe.

As a result of site-sharing scenarios (in which network operators share a site) as well as what are known as co-siting scenarios (in which one network operator operates a plurality of base stations, possibly of different mobile communications generations or mobile communications technologies, on one site), a higher number of antennae are increasingly being installed on each site. At least since the introduction of UMTS, a large number of the installed antennae are supplemented by a system which ultimately makes it possible to control the beam characteristic of the antennae electrically. This is the aforementioned RET configuration, with which a down-tilt angle can be set differently by remote control.

For example, WO 2009/102775 A2 discloses a multi-beam-shaping means in the form of a multi-RET means, which has three manually actuatable setting axles, so as to be able for example to control three separate antenna arrays by means thereof. To simplify the overall construction, it is proposed to use a shared control means for all three beam-shaping means.

Further, WO 2009/102774 A2 also discloses a multi-beam-shaping means, which comprises corresponding input and output axles for controlling the antenna means. In this context, a possibility has been proposed for decoupling the DC motor of the drive means from the phase shifter setting shaft, so as to be able to operate the phase shifter control heads manually in a simpler manner.

In all of the prior art documents, each band in the multi-band antennae is equipped with a "single RET actuator". Thus, for controlling an antenna in an antenna array, one input or drive axle is needed for each antenna.

Against this background, the object of the present invention is to provide an improved solution for a mobile communications antenna comprising a multi-beam shaping beams, with which, in an antenna which radiates in at least two bands or in a plurality of antenna for each site, the beam characteristics can be set differently in an improved and in particular simplified manner by comparison with conventional solutions. In this context, as little space as possible should be taken up on the antenna end face, since the antenna end face is already equipped with a plurality of for example coaxial plugs.

The object is achieved according to the invention in accordance with the features specified in claim 1. Advantageous configurations of the invention are provided in the dependent claims.

In the context of the invention, a solution which is much more advantageous than the prior art for a mobile communications antenna comprising a multi-beam-shaping means is proposed, in which for example merely a drive member and optionally an adjustment drive member are provided on the end face of the mobile communications antenna. If the mobile communications antenna according to the invention is configured with a multi-beam-shaping means which comprises an electric motor, it is possible to provide merely a drive interface and a switching interface on the antenna end face.

According to the invention, it is provided that a mobile communications antenna comprises a multi-beam-shaping means, the multi-beam-shaping means comprising a drivable drive member comprising a drive shaft. Further, the multi-beam-shaping means comprises at least two outputs, which each comprise a driven shaft substantially parallel to the drive shaft and each comprise a driven wheel which is rotationally engaged with the drive shaft. At least two phase shifters, which are arranged in the mobile communications antenna, are each in an operative connection with one of the outputs via a respective drive connection. The multi-beam-shaping means further comprises a switching means, by means of which the drive member can be brought selectively into an operative connection with one of the driven wheels.

A corresponding multi-beam-shaping means is of a very compact construction, since merely one drive is still required so as to actuate the at least two outputs. Because of the compact dimensions of the multi-beam-shaping means, it can be installed well on an antenna end face of the mobile communications antenna. Further, the multi-beam-shaping means can also be actuated manually or mechanically from outside, resulting in the multi-beam-shaping means having a lower susceptibility to faults and malfunctions.

In this context, the switching means preferably comprises a switching wheel, which is rotationally engaged with the drive wheel and the drive shaft and is displaceable on the drive shaft. In this context, the switching wheel can be displaced in translation on the drive shaft by means of the switching means, in such a way that the drive member can be brought into an operative connection with at least one of the two driven wheels.

In this context, the rotationally engaged but displaceable connection between the switching wheel and the drive shaft can be achieved in that the drive shaft is of a cross-sectional shape which is not rotationally symmetrical in the region remote from the drive member, and the switching wheel comprises in the centre a switching wheel opening which corresponds to the cross-sectional shape of the drive shaft. This ensures that the switching wheel is rotationally engaged with the drive shaft, but is displaceable along the longitudinal extent of the drive shaft.

A correspondingly configured beam-shaping means has a small diameter, in such a way that it takes up less space on an antenna end face of a mobile communications antenna. Further, by means of the multi-beam-shaping means according to the invention, a plurality of driven shafts and thus a plurality of phase shifters can also be controlled simultaneously if the switching wheel is of a corresponding thickness, in such a way that the switching wheel can be brought into an operative connection with a plurality of driven wheels simultaneously.

In a further embodiment of the present invention, the end-face projection of the driven shafts is arranged on a circle segment about the drive shaft as the circle centre. The driven shafts and the driven wheels are thus arranged about the drive shaft in a helix. At least two of the outputs each further comprise at least a second wheel, which is rotationally engaged with the respective driven shaft in such a way that at least two of the second wheels are arranged in one or more planes, in such a way that the switching wheel can be brought into an operative connection with at least two of the second wheels simultaneously.

A corresponding configuration of the mobile communications antenna is of a particularly compact construction, since the driven shafts and driven wheels are arranged about the drive shaft in a helix. Further, a corresponding configuration of the mobile communications antenna makes what is known as "central locking" of the driven shafts possible, since the switching wheel can take up a position in which the switching wheel is in an operative connection with all of the driven wheels. As a result of the operative connection of the switching wheel with all of the driven wheels, the respective driven wheels can also be brought into an operative connection with one another, and this leads to mutual stabilisation of the individual driven shafts. On the other hand, if for example an electric motor is used for driving the drive member, rotation of the respective drive shafts can be prevented by way of an operative connection of the switching wheel to all of the driven wheels at the same time, as a result of the holding torque of the electric motor. The second wheels can also be arranged in a plurality of planes. That is to say, at least two second wheels define a plane orientated perpendicular to the driven shafts. The drive member can be brought into an operative connection with the second wheels which are arranged in a shared plane, in such a way that any desired combinations of phase shifters can be adjusted simultaneously.

Preferably, the above-disclosed drive members and/or the switching wheel and the driven wheels are in the form of gear wheels, the individual teeth of the drive member and/or of the switching wheel and the driven wheels comprising chamfers on both sides. By way of a corresponding configuration of the gear wheels, simple mutual engagement of the gear wheels is ensured, preventing the individual wheels from catching on one another.

Preferably, the individual tooth end faces of the teeth of the switching wheel and of the driven wheels further comprise chamfers on both sides. By way of a corresponding configuration of the individual tooth end faces, it is ensured that, when the switching wheel is displaced, the switching wheel and the relevant driven wheel are orientated in such a way with respect to one another that the switching wheel and the driven wheel reliably mesh with one another.

In a further preferred embodiment, the switching means comprises a switching wheel, which is in an operative connection with the drive wheel and which can be moved by means of the switching means. By way of the movement of the switching wheel, the drive member can be brought into an operative connection with one of the at least two driven wheels by way of the movement of the switching wheel.

In this context, the drive member may for example merely comprise the drive shaft. In this case, the switching wheel is rotationally engaged with the drive shaft. In the event of a linear arrangement of the individual outputs, the switching wheel may for example be moved, that is to say displaced, linearly, in such a way that the switching wheel can be brought into an operative connection with one of the driven wheels, which are arranged in a straight line. On the other hand, however, the switching wheel may also be pivoted radially about a pivot centre, if the individual driven shafts and the driven wheels arranged on the driven shafts are arranged on a circle segment, the pivot centre about which the switching wheel pivots being the circle centre of the circle segment on which the respective drive shafts are arranged. In this case, the switching wheel is a planet gear.

A corresponding embodiment of the mobile communications antenna according to the invention is of a particularly planar construction, and is further particularly suitable for translational force transmission, that is to say for example if push rods or Bowden cables are used as the drive connections.

Preferably, the multi-beam-shaping means may further comprise an electric motor which is configured so as to drive the drive member and/or an adjustment drive member. The multi-beam-shaping means preferably further comprises a coupling which is configured in such a way that the motor is in an operative connection with the drive member or with the adjustment drive member.

By way of a corresponding configuration of the mobile communications antenna, merely one electric motor is needed for driving and switching the multi-beam-shaping means.

Likewise, whilst dispensing with the coupling, the multi-beam-shaping means can comprise two actuators, specifically one for moving the drive interface and one for moving the switching interface.

The invention is described in greater detail in the following by way of the drawings, in which, in detail:

FIG. 12 shows a modification of part of the multi-beam-shaping means in accordance with the first embodiment comprising what is known as a "central locking arrangement";

Figure 1:
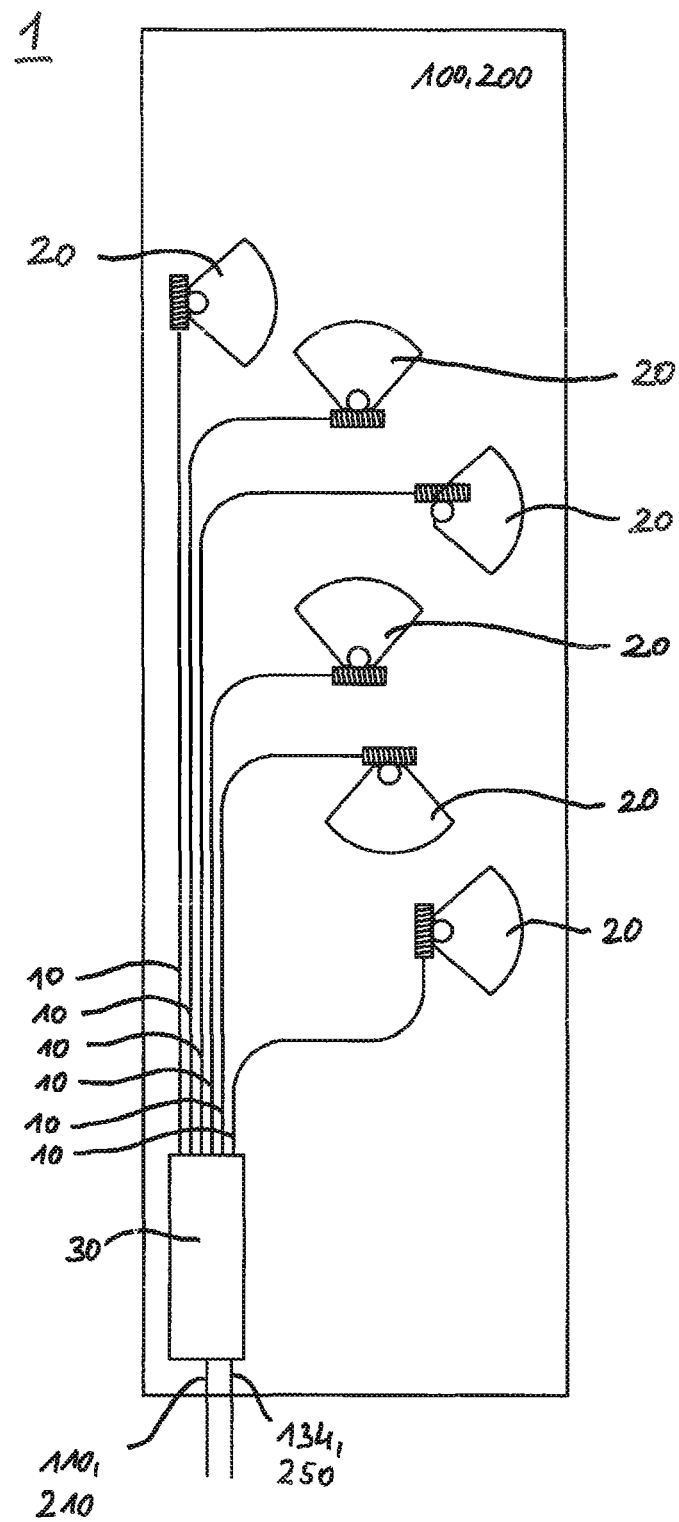
FIG. 1 is a schematic cross-sectional drawing of a mobile communications antenna according to the invention.

FIG. 1 is a schematic cross-sectional drawing of a mobile communications antenna 1 according to the invention, which is equipped with a multi-beam-shaping means 100, 200. A housing 30 is arranged in the lower edge region of the mobile communications antenna 1, and comprises a drive member 110, 210 and an adjustment drive member 134 or a locking bolt 250. The drive member 110, 210 and the adjustment drive member 134 or locking bolt 250 can be actuated from outside the mobile communications antenna 1. The contents of the housing 30 are described in detail below.

Instead of the drive member 110, 210 and the adjustment drive member 134 or locking bolt 250, a drive interface and a switching interface may also alternatively be provided on the housing 30, if the mobile communications antenna 1 is equipped with an electric motor which is configured so as to actuate or drive the drive member 110, 210 and/or the adjustment drive member 134 or locking bolt 250.

Output interfaces 124, not shown in FIG. 1, project out of the housing 30. In the example shown in FIG. 1 of a mobile communications antenna 1, six drive connections 10 are in an operative connection with these output interfaces 124. The opposite ends of the six drive connections 10 are respectively connected to six phase shifters 20. In this context, the respective phase shifters 20 may each, as shown, comprise an adjustment member or actuation element, for example in the form of a screw. Further, the respective phase shifters 20 may, as shown, comprise transmission and or setting means in the form of a gear wheel.

The respective drive connections 10 preferably consist of a flexible axle or a flexible shaft, but may also be designed and configured in such a way that the respective flexible axle 10 or flexible shaft 10 consists of rigid shaft and axle portions, and are respectively supplemented with resilient or flexible axle or shaft intermediate portions, cardan joints and so forth, so as to ensure connection of the output interface 124 as far as attachment interfaces of the phase shifters 20. Even an implementation of the drive connection consisting only of rigid shaft portions is possible, if shifted gears, for example bevel gears or intermediate transmissions, are provided for necessary changes in direction in the force and torque transmission. However, the drive connections 10 may also be a type of Bowden cable arrangement 10, in which a cable pull is guided in a longitudinally displaceable manner in a hose-shaped casing, for example counter to the force of a spring means.

The housing 30 may also be provided higher up in the mobile communications antenna 1 than shown in the embodiment, in the central or even in the upper region of the antenna 1. If at the same time correspondingly long shaft portions are inserted between the housing 30 and the drive member 110, 210 and adjustment drive member 134, 250, these interfaces remain accessible from the underside of the antenna 1. In this context, it is possible for some or all of the drive connections 10 to be arranged on different sides of the housing 30 from in FIG. 1, for example on the underside.

The mobile communications antenna 1 shown in FIG. 1 merely comprises a drive member 110, 210 and an adjustment drive member 134 or locking bolt 250, by means of which six phase shifters 20 can be actuated in the example shown in FIG. 1.

In the following, the contents of the housing 30 shown in FIG. 1 are described with reference to FIGS. 2 to 11. In this context, these contents which are described in the following need not necessarily be arranged directly in the housing 30, but may also alternatively be arranged directly in the antenna housing, that is to say in the radome. In the drawings shown, like reference numerals denote like components or like features, so as to avoid repeating descriptions which have already been given.

Figure 2:
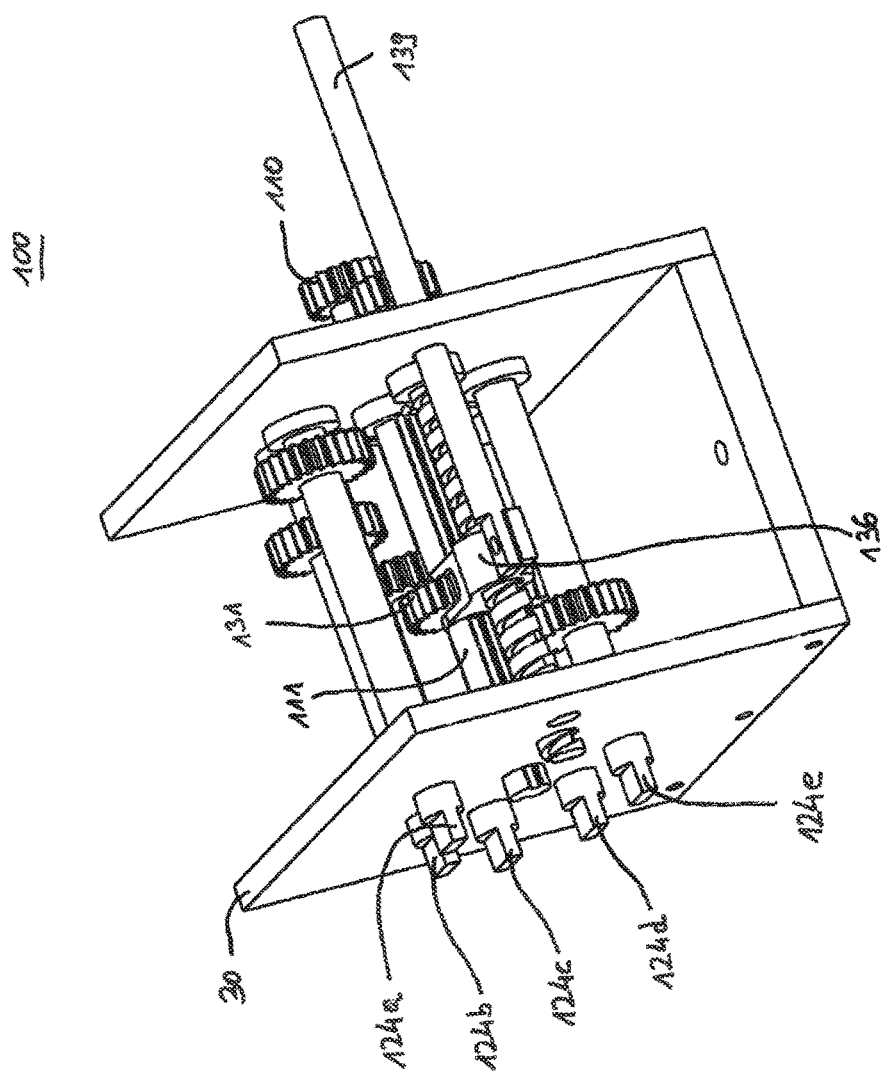
FIG. 2 is a perspective drawing of part of a multi-beam-shaping means in accordance with the first embodiment of the present invention.
Figure 3:
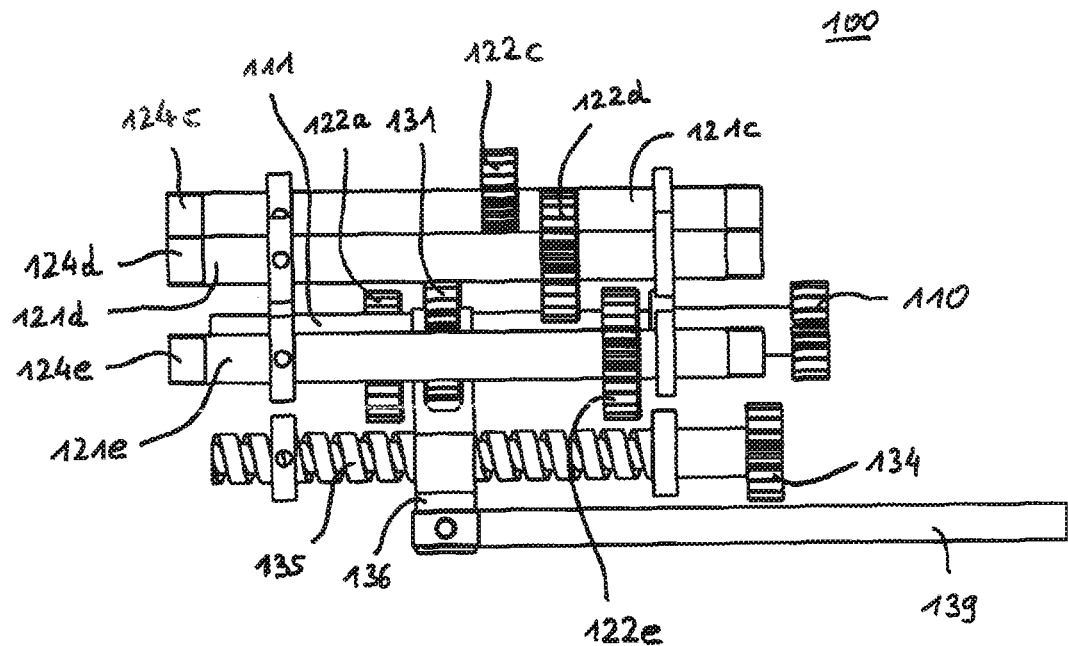
FIG. 3 is a side view of the part shown in FIG. 2 of the multi-beam-shaping means, without a housing.
Figure 4:
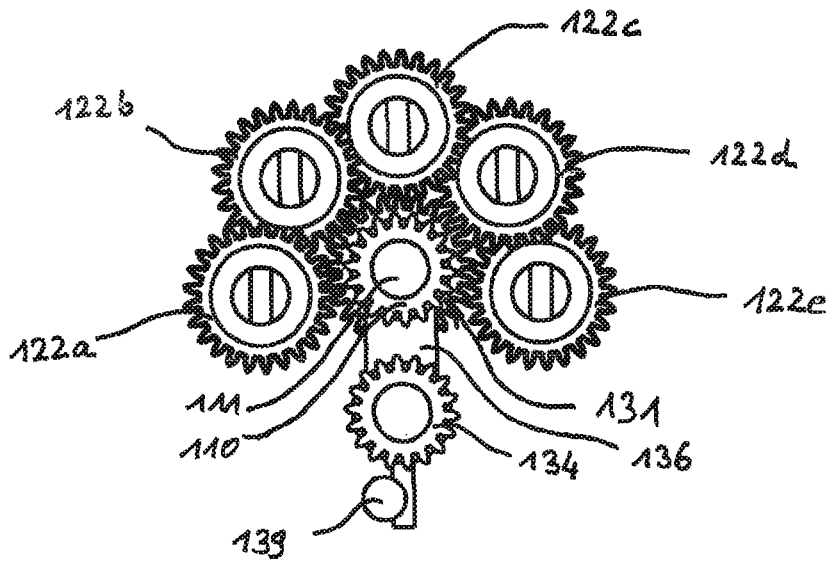
FIG. 4 is an end view of the part of the multi-beam-shaping means shown in FIGS. 2 and 3, without a housing.

It can be seen from FIGS. 2 to 4 that the contents of the housing 30 of the multi-beam-shaping means 100 comprise a drive member 110, which can be actuated for example from outside the mobile communications antenna 1. This drive member 110 is in the form of a drive wheel 110, which may preferably be in the form of a drive gear wheel 110. This drive member 110 may for example be actuated manually or can alternatively be driven by means of an electric motor (not shown). In this context, the electric motor could be arranged either in or outside the antenna housing. The drive member 110 is rotationally engaged with a drive shaft 111.

Further, in the example shown in FIGS. 2 to 4, the housing 30 comprises five outputs, which each comprise a driven shaft 121 substantially parallel to the drive shaft 111 and each comprise a driven wheel 122 which is rotationally engaged with the driven shaft 121. So as to make it easier to assign the driven shafts 121 and the driven wheels 122 in FIGS. 3 and 4, the driven wheels 122 have been provided with reference numerals 122a to 122e and the driven shafts 121 have been provided with reference numerals 121a to 121e in FIGS. 3 and 4, in such a way that correct assignment between the projection view of FIG. 4 and the side view of FIG. 3 is possible.

The respective driven shafts 121a to 121e end in respective output interfaces 124a to 124e, which are in an operative connection with respective phase shifters 20 via drive connections 10 which are shown schematically in FIG. 1.

Further, the contents of the housing 30 of the multi-beam-shaping means 100 in accordance with the first embodiment comprises a switching means (a remotely-controllable mechanical switch), which comprises an adjustment drive member 134 and an adjustment means 135, which cooperates with the adjustment drive member 134 and is configured as a threaded spindle 135. The switching means or remotely-controllable mechanical switch further comprises a slide 136 in the form of a slider 136, at one end of which a switching wheel 131 is arranged rotatably with respect to the slider 136. The slider 136 shown in FIG. 7 comprises a through-hole 137 having an internal thread, which is formed so as to cooperate with the thread of the threaded spindle 135. The slider 136 is connected to the threaded spindle 135 via the internal thread of the through-hole 137. The switching wheel 131 in turn is rotationally engaged with the drive member 110 and the drive shaft 111 and is displaceable on the drive shaft 111.

At the ends of the jaws 136a and 136b, the slider 136 comprises two cylindrical anti-twist devices 138, which comprise the drive shaft 111. This prevents rotation of the slider 136 with respect to the threaded spindle 135, resulting in the slider 136 carrying out a translational movement in the event of a rotational movement of the threaded spindle 135.

By actuating or rotating the adjustment drive member 134 which is configured as an adjustment drive wheel 134, the threaded spindle 135 which is rotationally engaged with the adjustment drive member 134 is rotated. This rotational movement of the threaded spindle 135 is converted into a translational movement of the slider 136. Therefore, a rotational movement of the threaded spindle 135 is converted into a translational movement of the switching wheel 131.

Instead of the threaded spindle 135, a telescope arrangement could also be provided as an adjustment means 135, on the ends of which a slider 136 or a slide 136 is arranged. A corresponding telescope arrangement could also be motor-driven. The adjustment drive member 134 may likewise be motor-driven.

On the end of the slider 136 opposite the switching wheel 131, an indicator means 139 is fastened to the slider 136. The indicator means 139, which is formed as a pin or shaft, projects through an opening in the housing 30 towards the outside, and is mounted by way of this opening, countering rotation of the slider 136. By way of the position of the indicator means 139 with respect to the housing 30 or with respect to the antenna housing, the position of the switching wheel 131 can be determined. It can thus be determined which of the driven wheels 122a to 122e the switching wheel 131 is in an operative connection with. However, the indicator means 139 may also be configured electronically, in such a way that the information regarding the position of the slider 136 and thus of the switching wheel 131 can be passed to an electronic processing unit.

From FIG. 4, which is a front projection drawing of the contents of the housing 30 of the multi-beam-shaping means 110 in accordance with the first embodiment, it can be seen that the respective driven wheels 122a to 122e intersect in projection. From FIG. 3, however, it can be seen that the respective driven wheels 122a to 122e are at different distances from the end face of the housing, in such a way that the respective driven wheels 122a to 122e are not in contact with one another. A corresponding arrangement is particularly compact, since the driven wheels overlap one another in projection.

However, the present invention is not limited to a corresponding arrangement of the driven wheels 122 and the driven shafts 121. Alternatively, the respective mutually separated driven shafts could be arranged along a shared axis line, and the switching wheel would be displaced on a drive shaft arranged parallel to the driven shafts, in such a way that the switching wheel could be brought into an operative connection selectively with at least one of the driven wheels. The respective driven shafts may be in an operative connection with the individual phase shifters, for example via resilient drive connections or via drive connections comprising deflection means.

Force or torque is thus transmitted from the drive member 110 to one of the output interfaces 124a to 124e by driving the drive member 110, which is rotationally engaged with the switching wheel 131 via the drive shaft 111. Both the switching wheel 131 and the drive wheels 122a to 122e are configured as gear wheels. When the switching gear wheel 131 meshes with one of the driven wheels 122a to 122e, a force or torque acting on the drive member 110 is transmitted to the corresponding driven shaft 121a to 121e.

From FIGS. 2 to 4, it can be seen that in an end-face projection the driven shafts 121a to 121e are arranged about the drive shaft 111 as a circle centre. Because of the spatial offset of the respective driven wheels 122a to 122e from the end face of the housing 30 or from an end face of the housing of the mobile communications antenna, the individual driven wheels 122a to 122e are arranged on a helical path about the driven shaft 111. In FIGS. 2 to 4, the switching wheel 131 is of a width such that, because of the spacing of the individual driven wheels 122a to 122e, in each case only one of the driven wheels 122a to 122e is in an operative connection with the switching wheel 131. Alternatively, however, the switching wheel 131 could be of a width such that it would be in an operative connection with two or more of the driven wheels 122.

Figure 5:
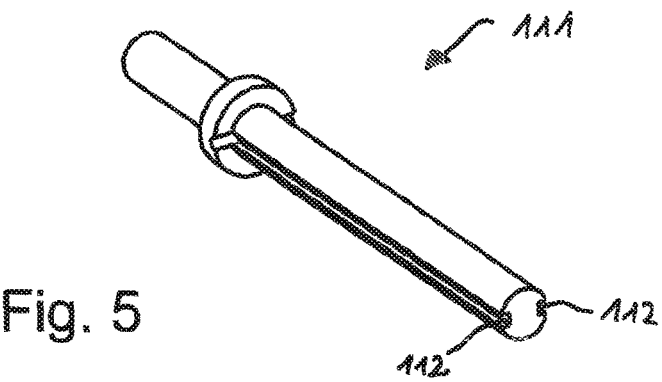
FIG. 5 is a perspective drawing of a drive shaft.
Figures 6A, 6B:
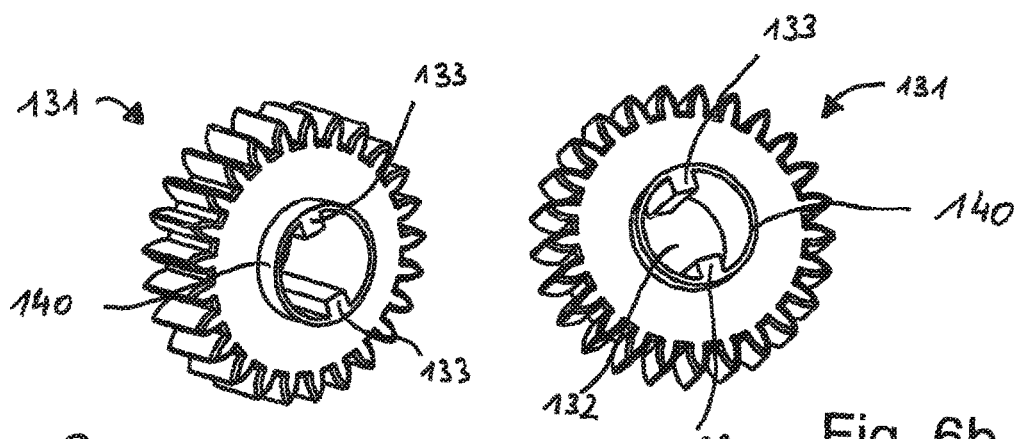
FIGS. 6a to 6b are perspective drawings of a switching wheel.

FIG. 5 is an isometric drawing of the driven shaft 111. The driven shaft 111 comprises two grooves 112 on the longitudinal side thereof in the region remote from the drive member 110. In the embodiment of the switching wheel 131 shown in FIG. 6, the switching wheel 131 comprises, in the switching wheel opening 132, two tongues 133 or two journals 133, which can engage in the grooves 112 of the drive shaft 131. This results in a tongue and groove connection between the switching wheel 131 and the drive shaft 111. Thus, the switching wheel 131 comprises a switching wheel opening 132, corresponding to the cross-sectional shape of the drive shaft 111, such that the switching wheel 131 is rotationally engaged with the drive shaft 111 and is displaceable along the longitudinal extent of the drive shaft 111. Further, cylindrical shoulders 140 are formed on the two end faces of the switching wheel.

For rotational engagement between the switching wheel 131 and the drive shaft 111, the switching wheel 131 being intended to be displaceable with respect to the drive shaft 111, it is in principle sufficient for the drive shaft 111 to be of a cross-sectional shape which is not rotationally symmetrical in the region remote from the drive member 110, and for the switching wheel to comprise in the centre a switching wheel opening 132 which corresponds to the cross-sectional shape of the drive shaft 111. Therefore, the drive shaft 111 could for example be of an elliptical shape in the region remote from the drive member 110. Accordingly, the switching wheel opening 132 of the switching wheel would also have to be of an elliptical shape.

Figure 7:
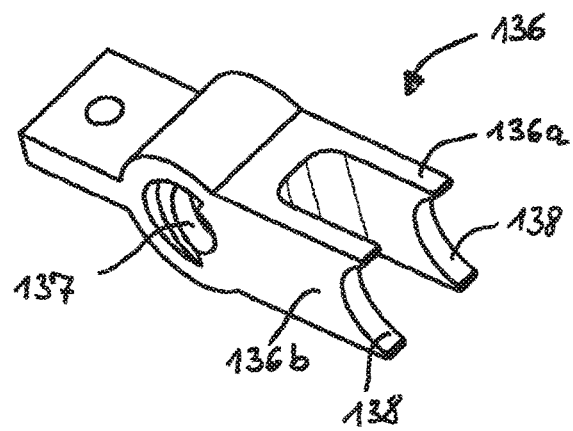
FIG. 7 is a perspective drawing of a slider.

FIG. 7 is a perspective drawing of the slider 136. The slider 136 comprises a through-opening 137 having an internal thread. The slider 136 further comprises, on the end facing the switching wheel 131, an anti-twist device 138 or adapter 138, which in cooperation with the cylindrical shoulders 140 on the switching wheel 131 and the drive shaft prevents the rotation of the slider 136 with respect to the threaded spindle 135. The adapter 138 is positioned on the shoulders 140 of the switching wheel in such a way that the drive shaft 111 and the switching wheel are not obstructed in the rotation thereof by the adapter 138. The adapter 138 is formed on two jaws 136a and 136b of the slider 136. The switching wheel 131 is positioned between the two jaws 136a and 136b of the slider 136, in such a way that by way of a translational movement of the slider 136 the switching wheel 131 can be displaced on the drive shaft 111.

Figure 8:
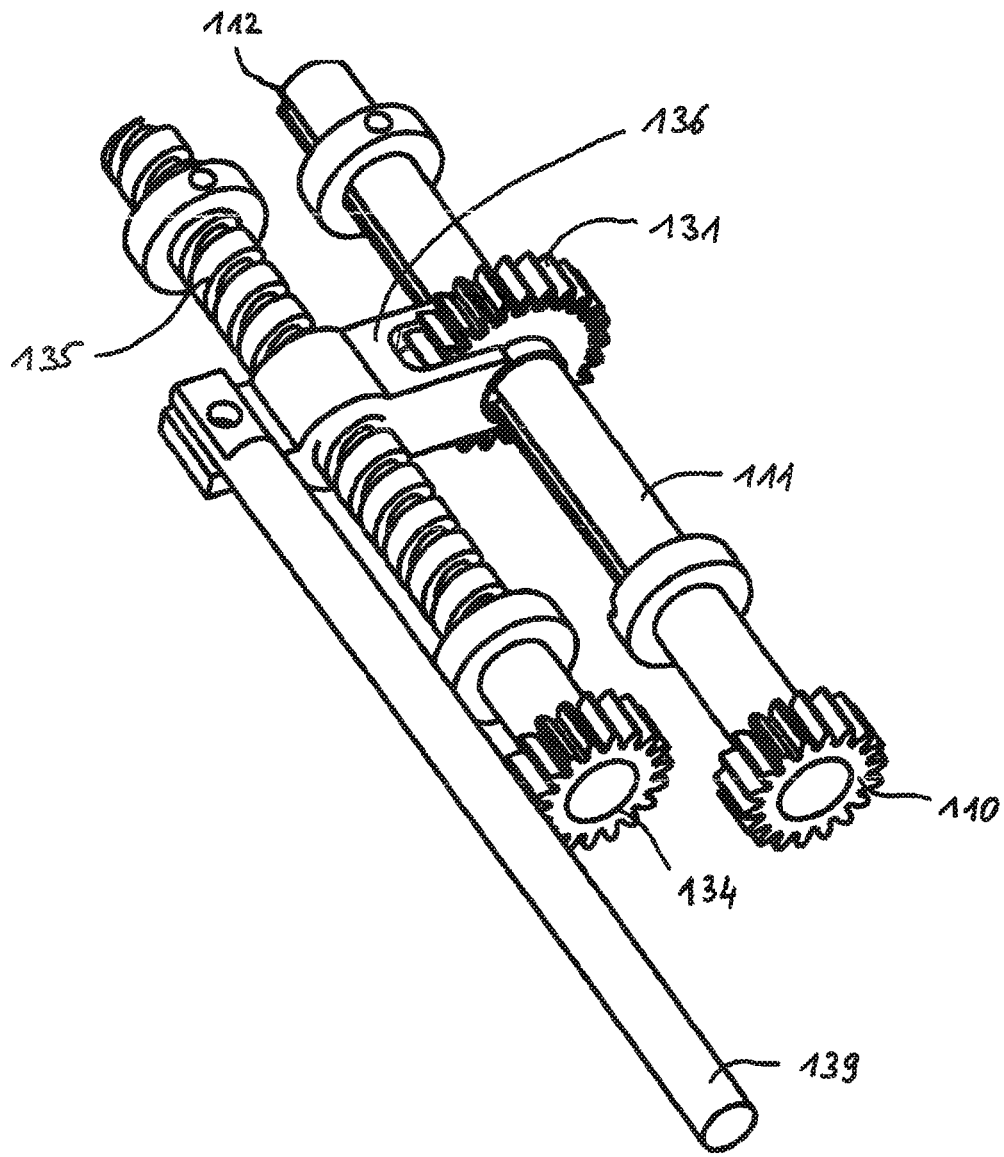
FIG. 8 is a perspective drawing of the drive train and the switching train of the multi-beam-shaping means.

FIG. 8 shows an example assembly of a switching means in a multi-beam-shaping means 100 according to the invention. The drive shaft 111 is rotationally engaged with the drive member 110. On the drive shaft 111, the switching wheel 131 is rotationally engaged with the drive shaft 111. The tongues 133 or journals 133 in the switching wheel opening 132 engage in the grooves 112 of the drive shaft 111, in such a way that the switching wheel 131 is displaceable with respect to the drive shaft 111.

The switching wheel 131 is arranged between the jaws 136a and 136b of the slider 136. The threaded spindle 135 projects through the through-opening 137 of the slider 136. Since the slider 136 cannot rotate with respect to the threaded spindle 135 because of the anti-twist devices 138, which cooperate with the switching wheel shoulders 140 and the drive shaft 111, rotation of the adjustment drive member 134, which is rotationally engaged with the threaded spindle 135, results in a rotational movement of the threaded spindle 135 being converted into a translational movement of the slider 136. This translational movement of the slider 136 is transmitted to the switching wheel 131. On the side of the slider 136 opposite the adapter 138, the indicator means 139 in the form of a pin is connected to the slider 136.

Figure 9:
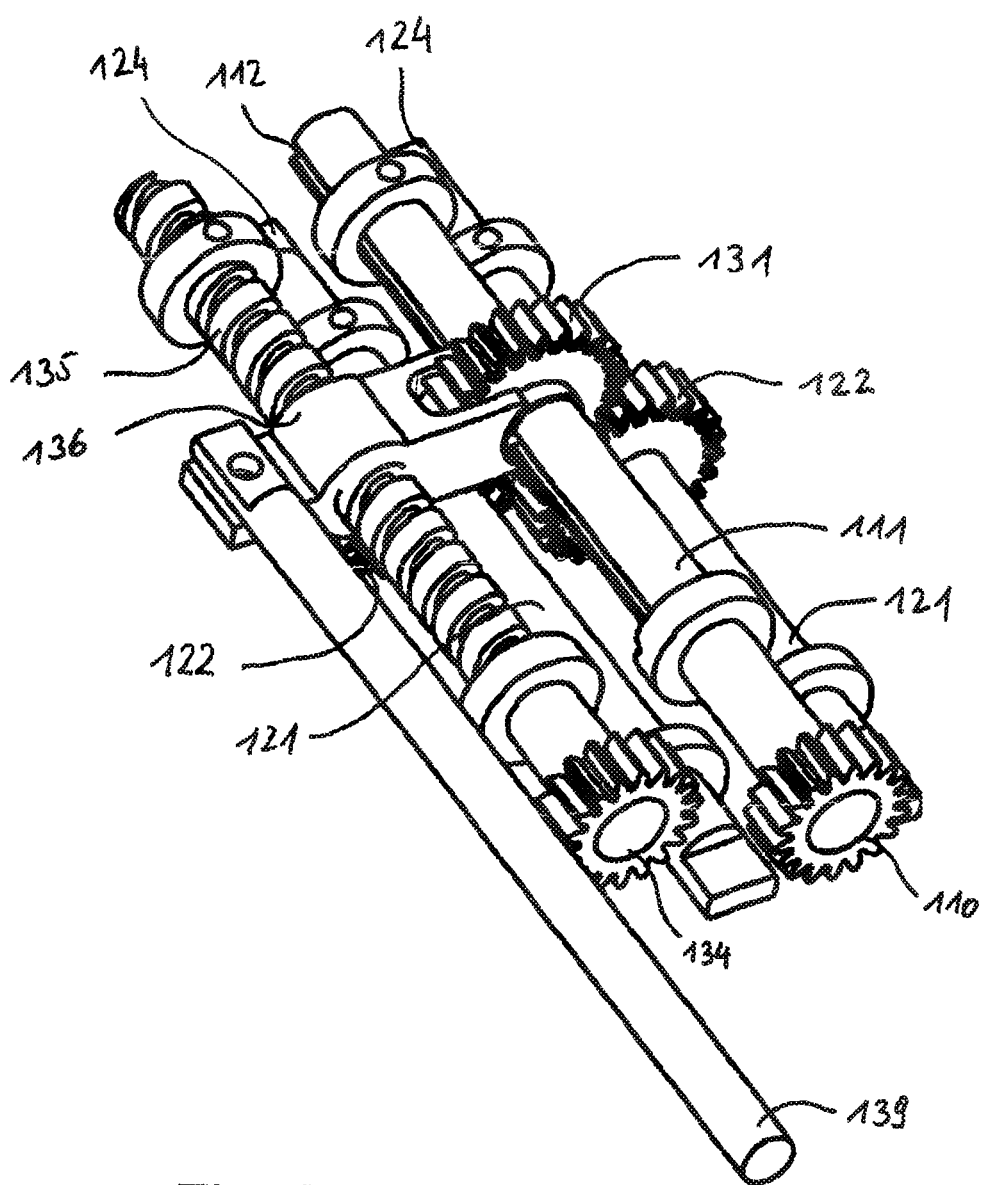
FIG. 9 is a perspective drawing of part of a multi-beam-shaping means in accordance with the first embodiment comprising two outputs.

FIG. 9 shows the same arrangement as FIG. 8, two outputs of the arrangement being added. Two drive shafts 121 are arranged parallel to the drive shaft 111 and to the threaded spindle 135. On the output shafts 121, a driven wheel 122 is rotationally engaged with the driven shafts 121 in each case. By displacing the switching wheel 131, by means of the above-disclosed switching means, the switching wheel 131 can be brought into an operative connection with any one of the driven wheels 122.

Figure 10:
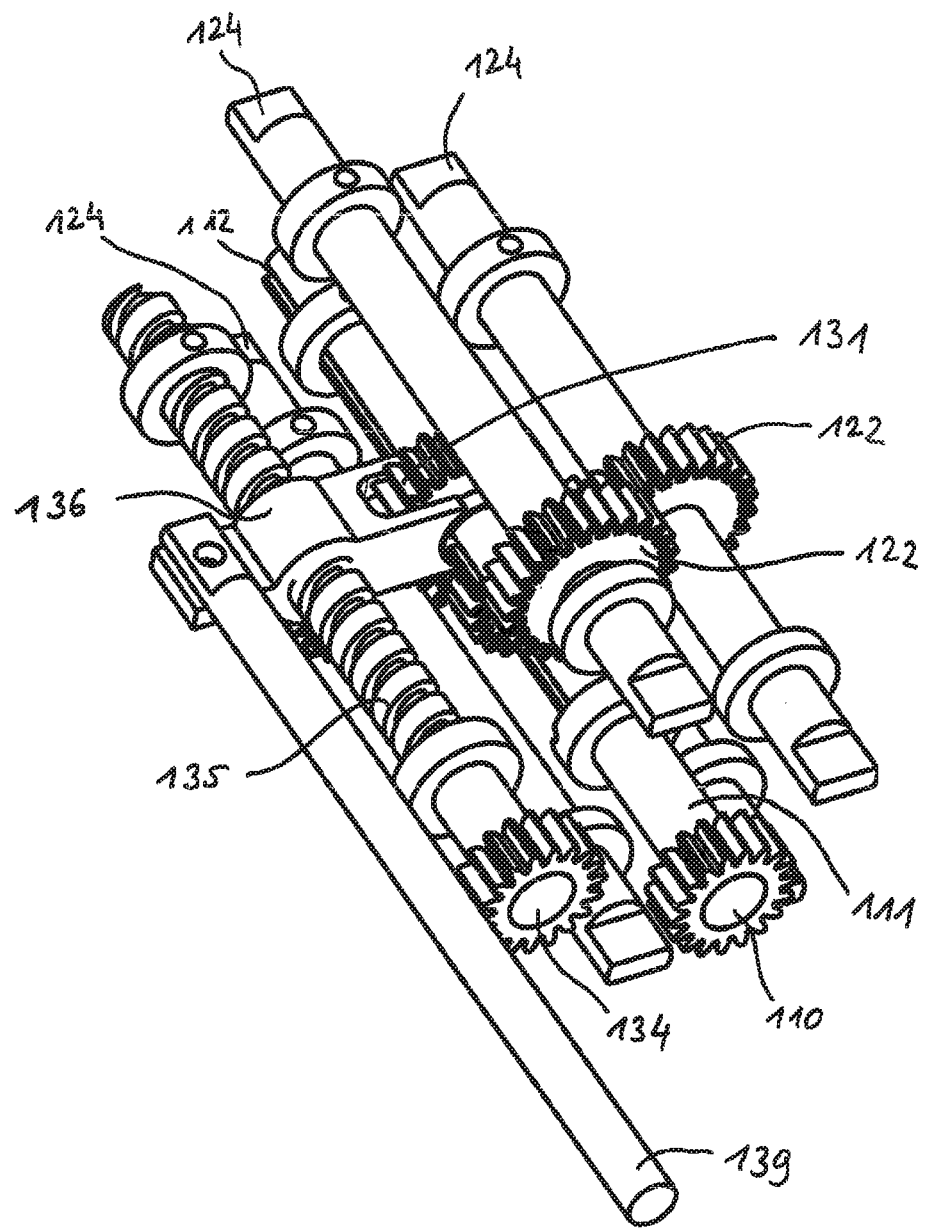
FIG. 10 is a perspective drawing of part of a multi-beam-shaping means comprising four outputs.

FIG. 10 shows the same arrangement as in FIG. 9, two further outputs being added to the two outputs, in such a way that a total of four outputs are provided in the arrangement. By actuating the adjustment drive member 134, the switching wheel 131 can be brought into an operative connection with any one of the driven wheels 122.

Figure 11A:
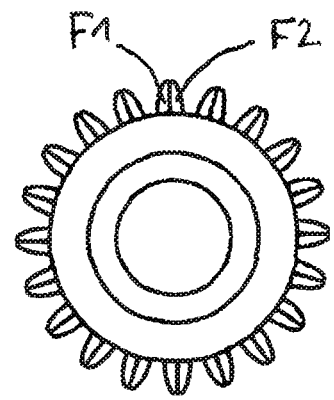
FIGS. 11a, 11b, 11c are an end view, a side view and a perspective drawing of a gear wheel.
Figure 11B:
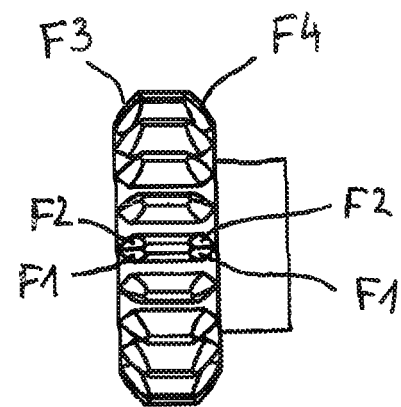
Figure 11C:
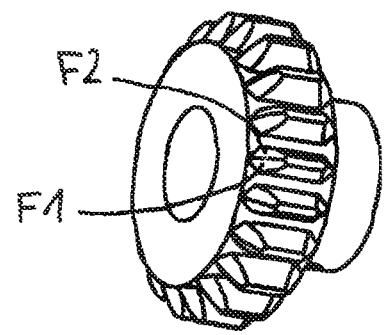

FIGS. 11a, 11b and 11c are different views of an advantageously configured gear wheel, which can be used as a drive member 110, as a drive wheel 122 and as a switching wheel 131. In this context, FIG. 11a is an end view of the gear wheel, FIG. 11b is a side view of the gear wheel and FIG. 11c is a perspective drawing of the gear wheel.

The gear wheel shown comprises chamfers or bevels F3, F4, with respect to the gear wheel end faces, on all of the teeth. In addition, each resulting tooth end face is provided with a chamfer F1, F2 on both sides, in such a way that an end-face edge results for each tooth in the end view 11a.

This ensures that when the switching wheel 131 is displaced, when teeth of the switching wheel 131 and teeth of the driven wheel 121 strike against one another, the two gear wheels displace one another in such a way that reliable mutual engagement of the teeth is ensured, in such a way that reliable meshing of the switching wheel 131 with the driven wheel 122 is achieved.

Figure 13B:
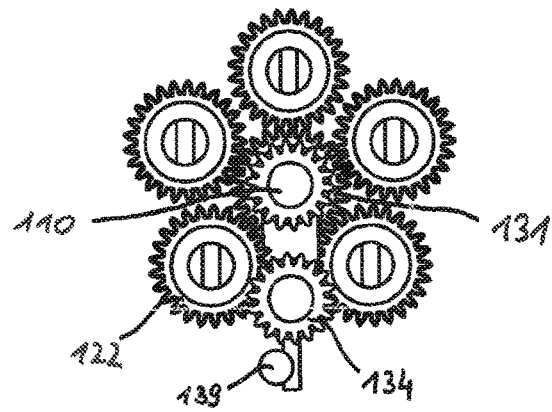
FIGS. 13a, 13b, 13c are a side view, a front view and a rear view, without a housing, of the part shown in FIG. 12 of the multi-beam-shaping means comprising what is known as the central locking arrangement.
Figure 13A:
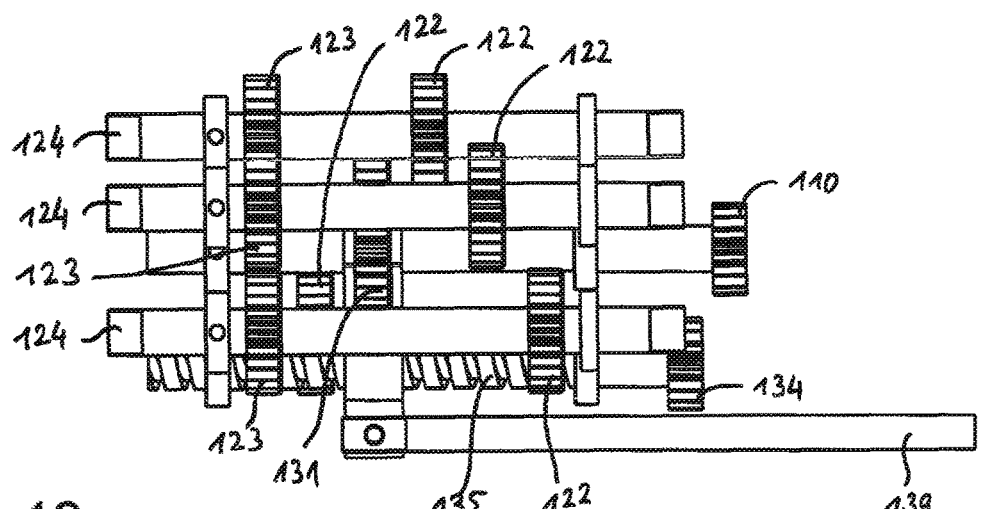
Figure 13C:
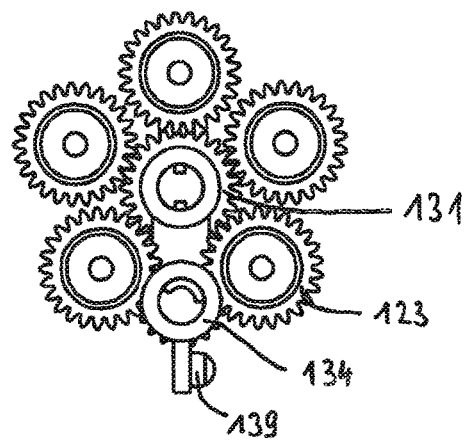

FIG. 12 shows a modification of the first embodiment of the contents of the housing 30 of the first embodiment of the multi-beam-shaping means 100. FIGS. 13a to 13c are a side view of the arrangement of FIG. 12, a front projection view of the arrangement of FIG. 12 and a rear projection view of the arrangement of FIG. 12, the housing not being shown in each case.

The arrangement in FIGS. 12 and 13 differs from the previously described arrangement in that each of the outputs further respectively comprises a second wheel 123, which is rotationally engaged with the respective driven shaft 121. The second wheels 123 are arranged in a plane perpendicular to the driven shafts 121 in such a way that the switching wheel 131 can be brought into an operative connection with all of the second wheels 123 simultaneously. A corresponding arrangement or configuration of the outputs comprising second wheels 123 can be referred to as a "central locking arrangement", since in the event of an operative connection of the switching wheel 131 with each of the second wheels 123 the respective second wheels 123 are in turn in an operative connection with one another via the switching wheel 131. This results in mutual stabilisation of the driven shafts.

If, by contrast, an electric motor is used for driving the drive member and/or the adjustment drive member, and if the switching wheel 131 is positioned in such a way that the switching wheel 131 is engaged with all of the second wheels 123, the holding torque of the electric motor further prevents rotation of the output shafts 121. As a result, central locking is brought about by way of the mutual stabilisation of the driven shafts 121 and further by way of the holding torque of the electric motor.

From FIGS. 13b and 13c, it can be seen that in a front projection the respective driven wheels 122 do not overlap with one another. The same applies to the respective second wheels 123. This can be seen from the rear projection view of FIG. 13c. The fact that the respective second wheels 123 do not overlap in projection, that is to say do not engage in one another, is absolutely necessary, since otherwise the second wheels 123 would collide.

With a correspondingly large size of motor, it is also possible in all of the variant embodiments to adjust all of the phase shifters simultaneously.

On the other hand, any desired combination of phase shifters can be adjusted simultaneously if second driven wheels 123, which cooperate with the phase shifters to be adjusted, are only positioned on the driven shafts in the plane mentioned above for the second wheels 123. It is even possible to provide further planes for third or an even greater number of driven wheels per drive shaft, making it possible to adjust further combinations of phase shifters simultaneously.

In the following, part of a multi-beam-shaping means 200 in accordance with a second embodiment of the present invention is disclosed with reference to FIGS. 14a to 16.

Figure 14A:
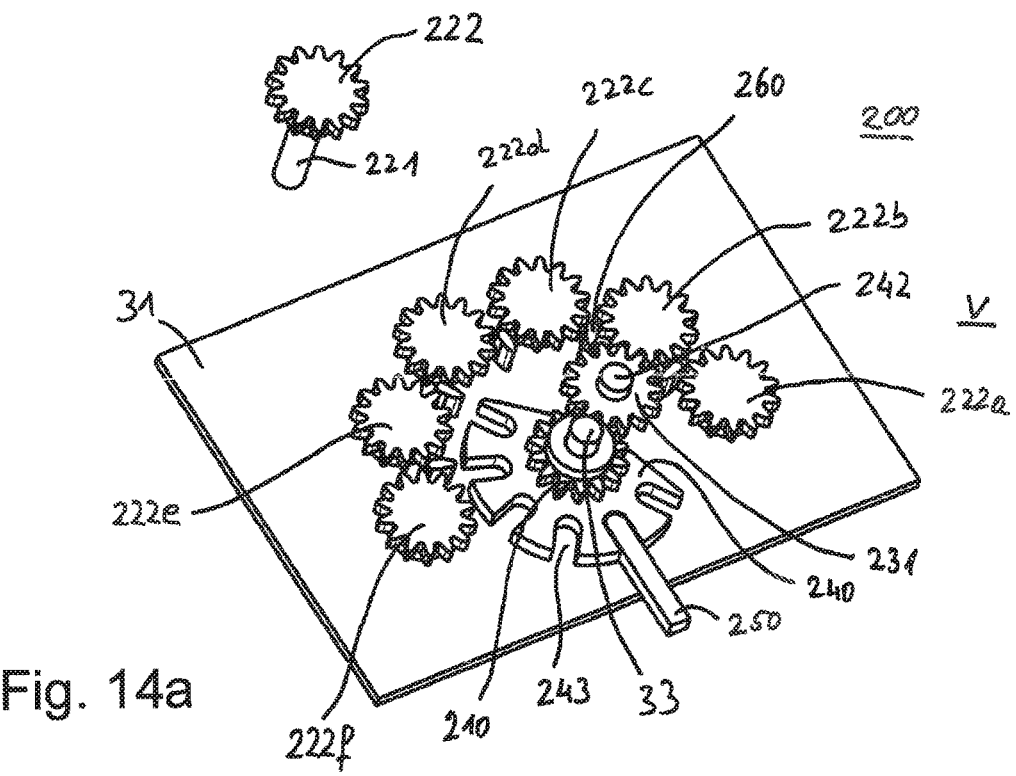
FIGS. 14a to 14d are perspective drawings of part of a multi-beam-shaping means in accordance with a further embodiment of the present invention comprising an activated arresting means and a deactivated arresting means.

FIG. 14a is a perspective drawing of part of the multi-beam-shaping means 200 in accordance with the second embodiment of the invention. The upper region of FIG. 14a shows an output which consists of a driven shaft 221 and a driven wheel 222, configured as a driven gear wheel 222, which is rotationally engaged with the output shaft 221. In the part shown in FIG. 14a of the multi-beam-shaping means 200, six outputs of this type are arranged in a plate-like material, which is shown separately in FIG. 15.

Figure 15:
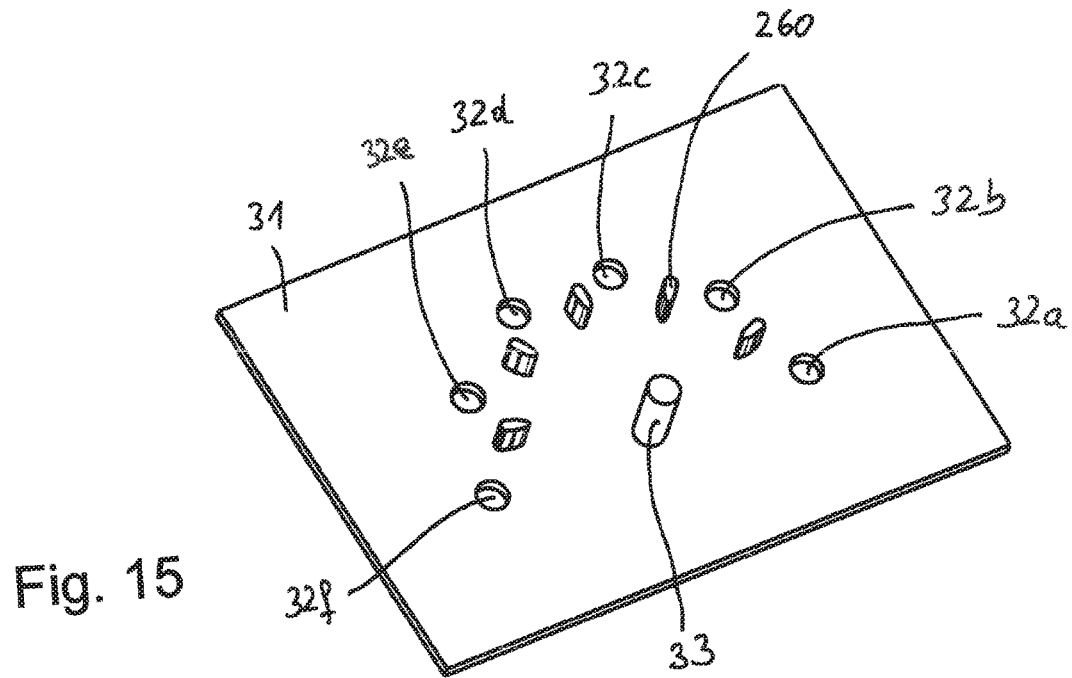
FIG. 15 is a perspective drawing of part of the antenna housing or of part of a housing, into which part of the multi-beam-shaping means in accordance with the second embodiment of the present invention can be introduced.

The plate-like wall 31 may be part of a housing 30 or part of the antenna housing or radome. FIG. 15 shows the corresponding housing wall 31 without the outputs and drives integrated into the housing wall. The housing wall 31 comprises six bearing holes 32a to 32f, which are arranged on a circle segment. A bearing pin 33 is arranged at the centre of this circle segment. Between the individual bearing holes 32a to 32f, a rolling means 260 in the form of a pivot tooth 260 is arranged in each case.

Figure 16:
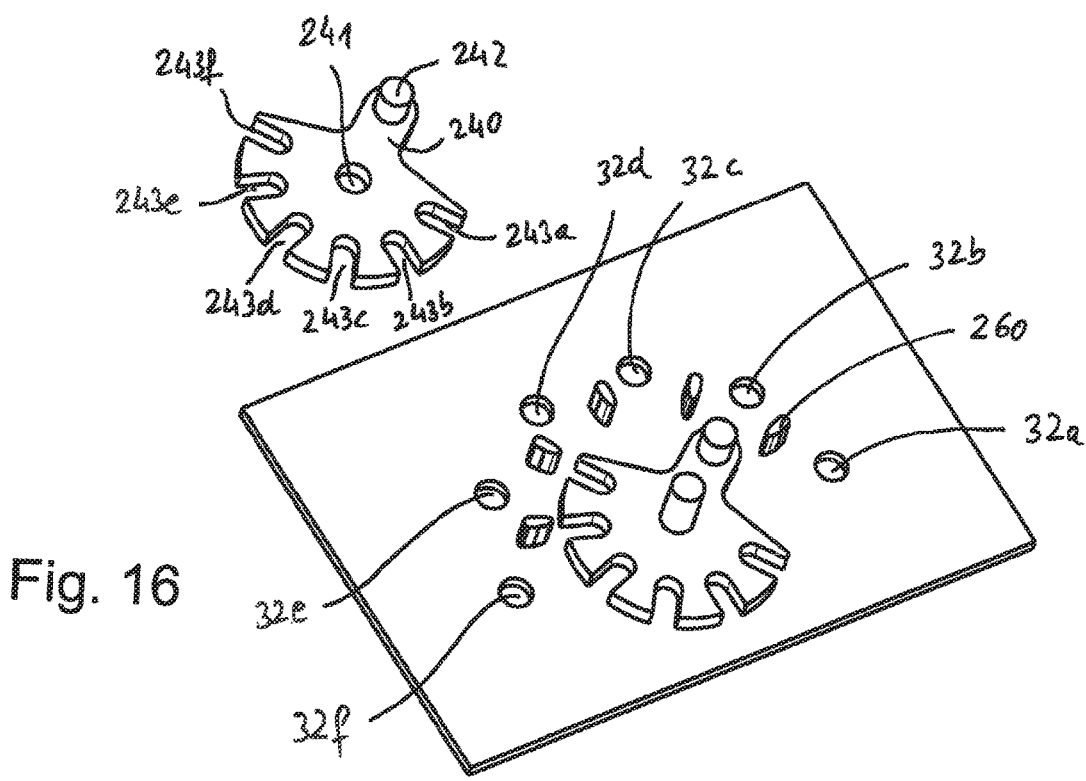
FIG. 16 is a perspective drawing of the housing part shown in FIG. 12 comprising a pivot means.

FIG. 16 shows the housing wall 31 shown in FIG. 15, a pivot means 240 being arranged on the bearing pin 33. The pivot means 240 is shown again separately in the upper region of FIG. 16. The pivot means 240 comprises a first fastening means 241 in the form of a bearing hole 241 and a second fastening means in the form of a bearing pin 242. The pivot means 240 further comprises six arresting means 243a to 243f in the form of locking indentations 243a to 243f. The pivot means 240 is mounted rotatably on the bearing pin 33 of the housing wall 31 by means of the first fastening means 241. The individual arresting means 243a to 243f are assigned to the corresponding bearing holes 32a to 32f.

FIG. 14a shows that the driven shafts 221 of the six outputs are mounted in the six bearing holes 32a to 32f. The driven wheels 222a to 222f are thus mounted rotatably in the bearing holes 32a to 32f.

The driven wheel 222b is in an operative connection with the switching wheel 231 in the form of a planet gear. The planet gear 231 is mounted rotatably on the second fastening means of the pivot means 240. The planet gear 231 is in turn in an operative connection with a drive member 210, in the form of a drive gear wheel, which is arranged on the pivot means 240 and rotatably mounted on the bearing pin 33 of the housing wall 31. The drive member 210 is thus mounted rotatably with respect to the housing wall 31 and with respect to the pivot means 240.

A locking bolt 250 engages in the locking opening 243b or in the locking depression 243b of the pivot means 240, in such a way that the pivot means 240 can no longer be rotated with respect to the housing wall 31. The locking bolt 250 thus takes on a locking position V. In the locking position V, in which the bolt 250 engages in the locking opening 243b, the planet gear 231 is in an operative connection with the driven wheel 222b and with the drive member 210. By driving the drive member 210, because of these operative connections, the driven wheel 222b and the driven shaft 221 connected thereto are driven. In turn, a drive connection (not shown in FIG. 14a) is in an operative connection with the driven shaft 221, and is in turn in an operative connection with a phase shifter (also not shown in FIG. 14a). Thus, in the position shown in FIG. 14a of the pivot means 240, the driven wheel 222b and the phase shifter connected thereto are actuated by driving the drive member 210.

For clearer understanding, FIGS. 14a to 14d do not show the axial position-securing means for the wheels 210, 222, 231 with respect to the housing wall 31 or the guide for the locking bolt 250. These may for example be implemented in a simple manner using moulded elements in a further housing wall positioned parallel to the housing wall 321.

Figure 14B:
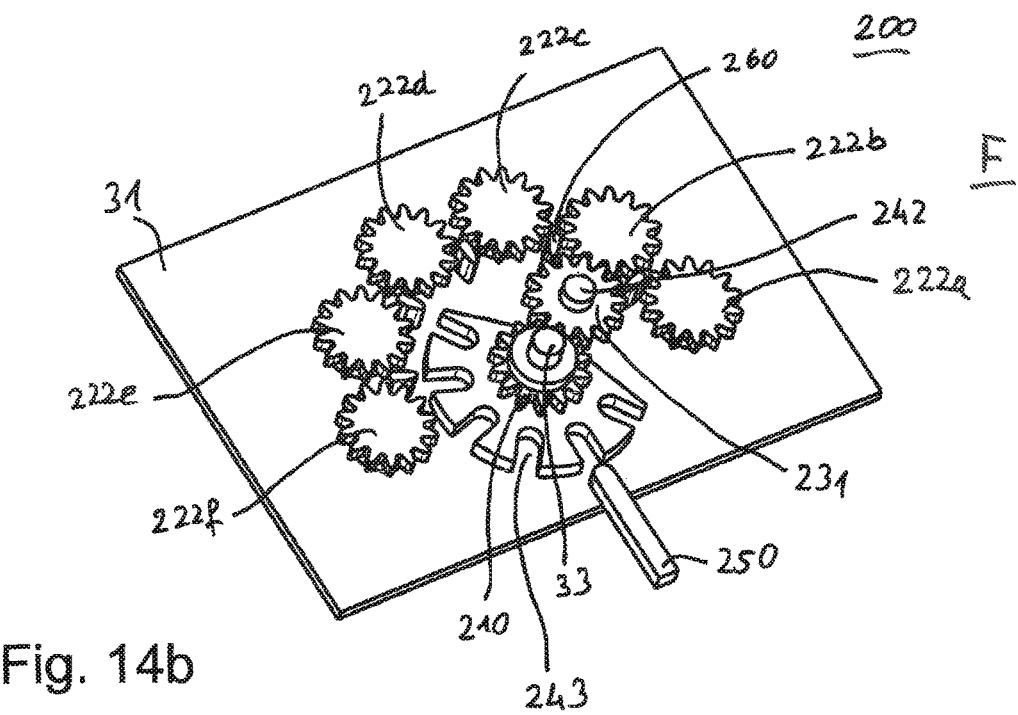
Figure 14C:
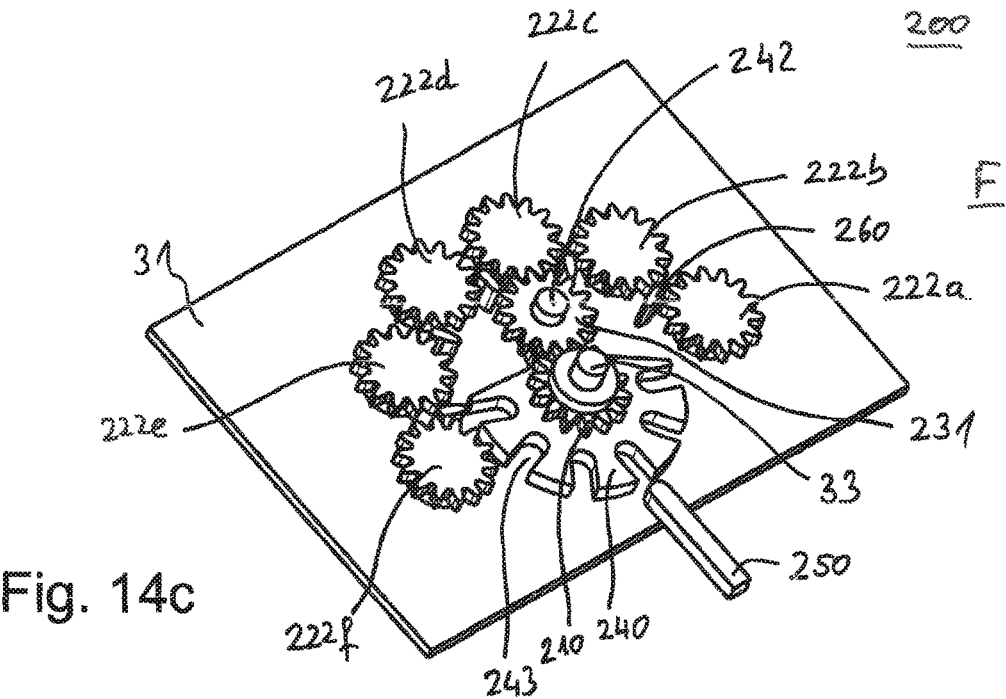
Figure 14D:
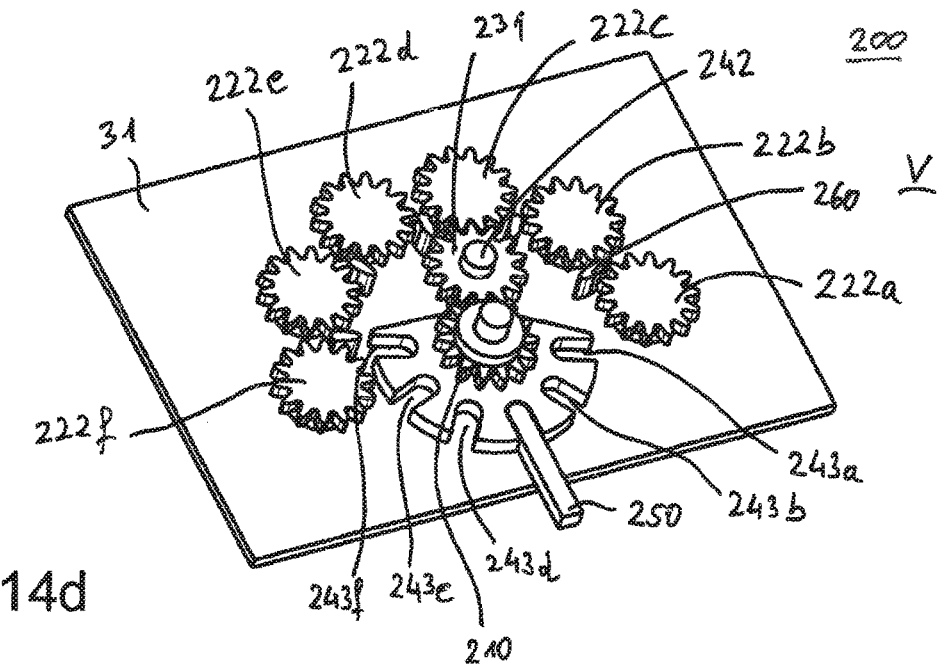

However, the drive member 210 can also be brought into an operative connection with the other driven wheels 222a, 222c to 222f. The drawings of FIGS. 14b to 14d show how the drive member 210 can for example be brought into an operative connection with the driven wheel 222c. In FIG. 14b, the locking bolt 250 is no longer engaged with the locking opening 243b. As a result, the pivot means 240 is rotatable with respect to the bearing pin 33. By driving the drive member 210, the planet gear 231 which is in an operative connection with the drive member 210 is driven, in such a way that the planet gear 231 rolls via the driven wheel 222b and via the rolling means 260, which is arranged between the driven wheel 222b and the driven wheel 222c. The planet wheel 231 can roll via the driven wheel 222b, since the driven wheel 222b is connected to a phase shifter which provides some resistance. This resistance in turn is greater than the rotational resistance of the pivot means 240, which is not locked. The rolling means 260 in the form of a pivot tooth 260, arranged between the driven wheel 222b and the driven wheel 222c, has the function whereby, in a particular position of the planet gear 231 in which it no longer meshes with the driven wheel 222b, the planet gear 231 engages in the pivot tooth 260 and rolls via it. The pivot teeth which are arranged between the individual driven wheels 222a to 222f thus have the purpose whereby, in a freewheeling position F of the locking bolt 250, the planet gear can roll via the pivot teeth 260 so as to be brought into different positions with respect to the driven wheels 222a to 222f.

The locking bolt 250 may for example be driven by a linear actuator or an electric motor comprising a downstream transmission for converting the rotational movement into a translational movement.

FIG. 14c shows the situation in which the planet gear 231 meshes with the driven wheel 222c, and is therefore in an operative connection therewith. Further, the locking bolt 250 is located in the freewheeling position F, in which the pivot means 240 and thus also the planet gear 231 would further be rotated or pivoted by driving the drive member 210. In FIG. 14d, the locking bolt 250 engages in the locking opening 243c, in such a way that the pivot means 240 is locked and can no longer rotate about the bearing pin 33. By driving the drive member 210, the driven wheel 222c is thus driven as a result.

The six arresting means or locking openings 243a to 243f are assigned to the corresponding bearing holes 32a to 32f and thus to the corresponding driven wheels 222a to 222f mounted in the bearing holes 32a to 32f. As a result of the locking bolt 250 engaging in a locking opening 243a to 243f, the planet gear 231 can thus be brought into an operative connection with one of the assigned driven wheels 222a to 222f.

Figure 17:
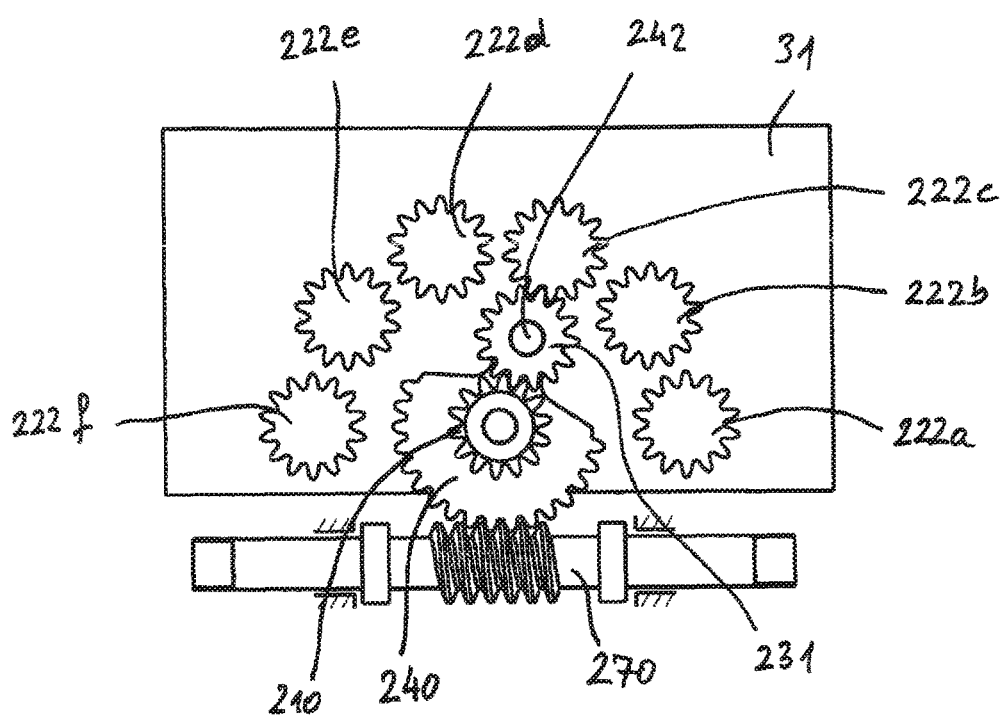
FIG. 17 is a drawing of a configuration of the invention modified from the variant shown in FIGS. 14a to 14d, 15 and 16, the pivot means being driven directly.

FIG. 17 shows a configuration modified with respect to the variant of the invention shown in FIGS. 14a to 14d and 15 and 16, the pivot means 240 being in the form of a worm wheel 240 and being driven directly via a screw 270. The worm drive is configured to be self-inhibiting, in such a way that the pivot wheel 240 only rotates when a motor is driving the screw 270. In this construction, the locking openings 243 in the pivot means 240, the locking bolt 250 and the pivot teeth 260 are not required.

In the second embodiment of the invention shown in FIGS. 14a to 14d and 15 and 16, the driven wheels 222a to 222f are arranged on a circle segment, at the centre of which the drive member 210 is arranged and engages with one of the driven wheels 222a to 222f by means of the planet gear 231. As an alternative to this embodiment, the drive member 210 could be arranged pivotably. In a corresponding configuration, the switching wheel or planet gear 231 would be the drive member. In this context, the pivot centre of the pivot movement of the drive member 210 would coincide with the circle centre of the circle on which the driven wheels 222a to 222f are arranged. The drive member 210 would have to be mounted correspondingly, and the position of the drive member 210 in the corresponding bearing would have to be fixable by means of an arresting means. With a fixed arresting means, the drive member 210 would be in an operative connection with one of the driven wheels 222a to 222f, without a switching wheel or planet gear having to be arranged between the drive member 210 and the corresponding driven wheel 222a to 222f. If the arresting means were not activated, by driving the drive member, it would roll via the individual driven wheels 222a to 222f and via the individual rolling means 260, in such a way that the drive member could be brought into an operative connection with any one of the drive wheels 222a to 222f.

In a further alternative of the second embodiment, the individual driven wheels 222a to 222f could be arranged in a straight line, in such a way that the driven shafts 221 span a shared plane, and the drive member could be moved back and forth in a corresponding guide means along the drive wheels, in such a way that the drive member 210 could be brought into an operative connection with any one of the driven wheels.

In the second embodiment too, it is possible to provide an indicator means, which could for example be connected to the pivot means 240. As a function of the position or angular position of the pivot means 240, the position of the indicator means connected to the pivot means 240 would also vary, in such a way that, by means of the position of the indicator means, it would be possible to draw a conclusion as to which of the driven wheels 222a to 222f the drive member 210 is in an operative connection with. Naturally, the position of the arresting means could also be detected electronically. Further, it would also be possible to provide an electronic indicator means instead of this mechanical indicator means.

LIST OF REFERENCE NUMERALS

1 Mobile communications antenna
10 Drive connection
20 Phase shifter
30 Housing
31 Housing wall
32a-32f Bearing hole
33 Bearing pin
100 Multi-beam-shaping means
110 Drive member
111 Drive shaft
112 Groove (of the drive shaft)
121 Driven shaft
122 and
122a-122f Driven wheel
123 Second wheel (on the driven shaft)
124 Output interface
131 Switching wheel
132 Switching wheel opening (in the switching wheel)
133 Tongue/journal (in the switching wheel opening)
134 Adjustment drive member (of the switching means)
135 Adjustment means/threaded spindle (of the switching means)
136 Slider (of the switching means)
136a, 136b Jaw (of the slider)
137 Through-opening/thread adapter (of the slider)
138 Anti-twist device
139 Indicator means (of the switching means)
140 Cylindrical shoulder on the switching wheel
200 Multi-beam-shaping means
210 Drive member
221 Driven shaft
222 and
222a-222f Driven wheel
231 Switching wheel, planet gear
240 Pivot means (of the switching means)
241 First fastening means (of the pivot means)
242 Second fastening means (of the pivot means)
243 and
243a-243f Arresting means, locking opening (of the pivot means)
250 Locking bolt
260 Rolling means, pivot tooth
270 Screw
F1, F2 Chamfer of the tooth end face
F3, F4 Chamfer or bevel of the tooth with respect to the gear wheel end face
F Freewheeling position
V Locking position

The invention claimed is:

1. Mobile communications antenna comprising a multi-beam-shaping arrangement, comprising:
a drivable drive member comprising a drive shaft;
at least two outputs, which each comprise a driven shaft substantially parallel to the drive shaft and each comprising at least one driven wheel which is rotationally engaged with the drive shaft;
at least two phase shifters, which are each in an operative connection with one of the outputs via a respective drive connection; and
a remotely-controllable mechanical switch structured to selectively bring the drive member into an operative connection with one or the other of the driven wheels,
wherein the remotely-controllable mechanical switch comprises:
an adjustment drive wheel,
an actuator which is in an operative connection with the adjustment drive wheel, and
a slider which cooperates with the actuator and on one end of which a switching wheel is arranged rotatably with respect to the slider, the actuator bringing about a translational displacement of the slider and thus of the switching wheel by way of actuation of the adjustment drive wheel.

2. Mobile communications antenna according to claim 1, wherein:
the switching wheel is rotationally engaged with the drive member and the drive shaft and is displaceable on the drive shaft;
the switching wheel being displaceable in translation on the drive shaft by the mechanical switch, in such a way that the drive member can be selectively brought into an operative connection with at least one of the two driven wheels.

3. Mobile communications antenna according to claim 2, wherein:
the drive shaft is of a cross-sectional shape which is not rotationally symmetrical in a region remote from the drive member; and
the switching wheel comprises in the center thereof a switching wheel opening, which corresponds to the cross-sectional shape of the drive shaft, such that the switching wheel is rotationally engaged with the drive shaft, but is displaceable along the longitudinal extent of the drive shaft.

4. Mobile communications antenna according to claim 1, wherein:
the actuator is configured as a threaded spindle;
the slider comprises a through-opening having an internal thread,
the threaded spindle is received in the through-hole of the slider, and the slider is fastened in such a way that it is not entrained in rotation when the threaded spindle rotates, in such a way that a rotational movement of the threaded spindle is converted into a translational movement of the slider.

5. Mobile communications antenna according to claim 1, wherein:
in an end-face projection, the driven shafts are arranged on a circle segment about the drive shaft as a circle center; and
the at least two outputs each further comprise at least one second wheel, which is rotationally engaged with the respective driven shaft in such a way that at least two of the second wheels are arranged in one or more planes, in such a way that the switching wheel can be selectively brought into an operative connection with at least two of the second wheels simultaneously.

6. Mobile communications antenna according to claim 1, wherein:
the switching wheel is in an operative connection with the drive member; and
the mechanical switch is structured to move the switching wheel in such a way that the drive member is brought into an operative connection with a selected one of the two driven wheels via the switching wheel.

7. Mobile communications antenna according to claim 6, wherein the switching wheel, together with a switching axle on which the switching wheel is mounted, is radially pivotable about the drive shaft as a pivot center.

8. Mobile communications antenna according to claim 6, wherein:
the mechanical switch comprises a pivot;
the pivot and the drive member are rotatably mounted at a circle center of a circle segment on which the driven shafts are arranged;
the switching wheel is rotatably mounted on the pivot in such a way that the switching wheel cooperates with the drive member;
the pivot comprises an stop structured to arrest the pivot, in such a way that, when the pivot is arrested, one of the driven wheels is driven via the drive member by driving the drive member.

9. Mobile communications antenna according to claim 8, wherein:
the stop comprises at least two locking openings in the pivot, each locking opening being assigned to one of the driven wheels;
the multi-beam-shaping arrangement further comprises a locking bolt, which can take on a freewheeling position and a locking position;
in the freewheeling position, the locking bolt does not engage in any of the locking openings, in such a way that, by driving the drive member, the pivot rotates about a first fastener and the switching wheel is pivoted about the first fastener as a pivot center;
in the locking position, the locking bolt engages in one of the locking openings, in such a way that, by driving the drive member, the drive wheel assigned to the locking opening is driven via the drive member.

10. Mobile communications antenna according to claim 8, wherein the multi-beam-shaping arrangement comprises at least one fixed rolling member, which is arranged between the driven shafts in such a way that, when the drive member is driven, when the pivot is not arrested, the deflection wheel can be brought into contact with the rolling member in such a way that the deflection wheel which is driven by the drive member rolls via the rolling member, and when the pivot means is arrested, the deflection wheel is not in contact with the rolling member.

11. Mobile communications antenna according to claim 6, wherein the multi-beam-shaping arrangement comprises at least one fixed-position rolling member, which is arranged between the driven shafts in such a way that, when the drive member is driven, it can be brought into contact with the rolling member in such a way that the drive member rolls via the rolling member.

12. Mobile communications antenna according to claim 11, wherein the individual teeth of the drive member and/or of the switching wheel and drive wheels comprise chamfers on both sides with respect to gear wheel end faces.

13. Mobile communications antenna according to claim 12, wherein the individual tooth end faces of the teeth of the switching wheel and the drive wheels further comprise chamfers on both sides.

14. Mobile communications antenna according to claim 1, wherein, in an end-face projection, the driven shafts are arranged on a circle segment about a circle center.

15. Mobile communications antenna according to claim 14, wherein the drive shaft or a pivot center of the drive member is in the circle center.

16. Mobile communications antenna according to claim 1, wherein the mechanical switch further comprises an indicator, which is formed so as to indicate which of the driven wheels the drive member is in an operative connection with.

17. Mobile communications antenna according to claim 1, wherein the drive member and/or the switching wheel and the drive wheels comprise gear wheels.

18. Mobile communications antenna according to claim 1, wherein the multi-beam-shaping arrangement further comprises plural actuators, which are formed so as to selectively, alternately drive either (a) the drive member or (b) the adjustment drive wheel.

19. Mobile communications antenna according to claim 18, wherein the multi-beam-shaping arrangement further comprises a drive interface and a switching interface, the drive interface being configured to transmit drive commands to the motor, and the switching interface being configured to transmit switching commands to the mechanical switch.

20. Mobile communications antenna according to claim 1, wherein the multi-beam-shaping arrangement further comprises an actuator and a coupling, which are structured whereby the actuator is in an operative connection with the drive member or with the adjustment drive wheel.

21. A multi-beam-shaping mobile communications antenna comprising:
a drive shaft;
a first driven shaft comprising a first driven wheel rotationally engaged with the drive shaft;
a first phase shifter in an operative connection with the first driven shaft via a first drive connection;
a second driven shaft comprising a second driven wheel rotationally engaged with the drive shaft;
a second phase shifter in an operative connection with the second driven shaft via a second drive connection; and
a remotely controllable mechanical switch operatively coupled to the drive shaft, the remotely-controllable mechanical switch structured to selectively bring the drive shaft into an operative connection with one, the other or both of the first and second driven wheels, wherein the remotely controllable mechanical switch comprises:

an adjustment drive wheel, an actuator which is in an operative connection with the adjustment drive wheel, and a slider which cooperates with the actuator and on one end of which a switching wheel is arranged rotatably with respect to the slider, the actuator bringing about a translational displacement of the slider and thus of the switching wheel by way of actuation of the adjustment drive wheel.

22. The antenna of claim 21 wherein the drive shaft has a region with a rotationally-non-symmetrical cross-sectional shape, and the switching wheel has a switching wheel opening shaped to correspond to the rotationally-non-symmetrical cross-sectional shape of the drive shaft region, the switching wheel being rotationally engaged with but displaceable along the longitudinal extent of the drive shaft, the switching wheel engaging with the first driven shaft in a first longitudinal position relative to the drive shaft, the switching wheel engaging with the second driven shaft in a second longitudinal position relative to the drive shaft.

23. The antenna of claim 21 wherein the first and second phase shifters are connected to antenna radiators to independently shape different beam antenna radiator radiation patterns using a single common drive motor based on remote control of the mechanical switch.

* * * * *